United States Patent Office 3,712,847
Patented Jan. 23, 1973

3,712,847
LAMINATED LAMELLAR LAMINATE
Ole-Bendt Rasmussen, 7 Topstykket,
3460 Birkerod, Denmark
Original application Dec. 29, 1967, Ser. No. 694,660, now
Patent No. 3,547,761, dated Dec. 15, 1970. Divided
and this application Sept. 28, 1970, Ser. No. 76,196
Claims priority, application Great Britain, Dec. 30, 1966,
58,429/66
The portion of the term of the patent subsequent to
Dec. 15, 1987, has been disclaimed
Int. Cl. B32b 5/22, 5/24
U.S. Cl. 161—55                                  2 Claims

ABSTRACT OF THE DISCLOSURE

A laminate comprising at least two sheets of which at least one is an extruded sheet in which at least two different polymeric materials form alternate reinforcement and filling lamellar layers extending from surface to surface of the sheet at a so small inclination (below 2°) as to form a (directly extruded) quasi-laminate, the reinforcement layers of which are of a thinness approaching colloidal dimensions, the adjacent sheets of said laminate having different direction of molecular orientation.

CROSS REFERENCE TO RELATED APPLICATION

This application is a voluntary division of my prior copending application Ser. No. 694,660 filed Dec. 29, 1967, now U.S. Pat. 3,547,761.

BACKGROUND OF THE INVENTION

The present invention relates to an extruded sheet material consisting of a polymeric reinforcement material and a filling material.

The combination of reinforcing material and filling material in a sheet is usually made by simple compounding before the formation of the sheet, or by using the reinforcement material in the form of a woven, knitted or non-woven fabric to which the filling material is adhered, or by laminating the filler to one or several films of the reinforcement material. In the first case the reinforcement material is substantially weakened at least with respect to creep resistance, whereas the production of the second kind of sheet material is relatively complicated and expensive, and the third kind of sheet material generally has low abrasion resistance or a tendency to delamination on bending. The present invention has for its object to overcome the above-mentioned drawbacks by use of the reinforcement and filling materials in a new, suitable laminated arrangement which easily can be produced by extrusion.

SUMMARY OF THE INVENTION

In the extruded sheet material according to my invention a reinforcing polymeric material and a filling material are present in the sheet material in the form of interspersed intimately adhering thin lamellae, the former having an overall thickness between 0.1 and 10 microns and traversing the flat dimension of the sheet at an overall angle of less than 2° to the surfaces of the sheet. The said range of thickness is actually about the marginal range between dimensions which with regard to dispersions are considered to be colloidal, and dimensions which in the same respect are considered to be macrodimensions. Probably as a result of the fact that a reinforcement material and a filling material have very different mechanical characteristics, it has been found that a laminate of such materials tends to behave more and more as an undisruptable whole when the thickness of the layers of the former material approaches or reaches colloidal dimensions. If, on the other hand, the thickness of the reinforcement layer gets really down in colloidal dimensions, surface irregularities will pay an essential role to weaken the material. The indicated range of thickness has been found generaly suitable, and more particularly, the range between 0.5 micron and 5 microns is generally preferable. The use of the colloidal or almost colloidal thickness of the layers has a further advantage in that local failures in the raw materials as well as scratches in the surface made by abrasion, have very little influence on the tensile strength of the sheet. It would be very difficult and uneconomical to produce, handle and laminate film material of such fine thickness in conventional manner in order to make laminates of the thickness which is generally required for packaging and other purposes. However, the invention provides a practical and economical method of making a sheet material of the kind described, said method comprising feeding fluid first extrudable, polymeric material suitable to form said reinforcement material to first orifices in a row of orifices in an extruding device, feeding a fluid second extrudable material suitable to form said filling material to second orifices in the row, extruding the fluid materials through the orifices into a collecting chamber that extends along the length of the row and has an outlet slot extending along the length of the row, and while extruding said fluid materials through said collecting chamber and slot, subjecting the extruded sheet to a transverse smearing action.

If the thickness of the lamellae is not sufficiently reduced during the passage through the extruding device, the sheet material must be drawn subsequently in one or several operations.

The transverse smearing out, by which the lamellae of the material are brought down to at least a relatively fine thickness, if not fully brought down to the final thickness of between 0.1 micron and 10 microns, can be established by movement of the chamber and the row of orifices relative to and along one another. In this case the collecting chamber should preferably narrow down immediately after the orifices preferably in a neck, i.e. very rapidly in order to enable a sufficient shear to be produced between the nozzle in the row and the walls of the collecting chamber. The extruded lamellae are hereby deflected from the forward direction and will continue their flow in a "broadside" manner. The "broadside" flow through the collecting chamber and the slot at its end will make the lamellae drag in the direction of extrusion, i.e. the sides of the lamellae will be dragged in relation to their central portion.

An alternative method of establishing the transverse smearing out is to move one side of the collecting chamber relative to and along the other. The sides of the lamellae will thereby be dragged in relation to each other. In this case it is less important for the collecting chamber to narrow down, and there may even be a long chamber zone, where no transverse shear occurs, between the row of orifices and the moved parts of the collecting chamber, since the nozzle parts need not partake in the smearing action in this case. However, it is also possible to combine the two methods.

The orifices for extrusion of a large number of lamellae side by side into the collecting chamber are preferably closely spaced, elongated slots forming an angle with the row in which they are arranged.

It seems impossible to make the spacing between the extrusion orifices of the row closer than about 1 mm., and generally a spacing of 2–3 mm. is preferable for constructional reasons. If the extrusion velocities of the two polymeric materials are equal, the original thickness of the lamellae will equal the distance between the slots, however it is easy to obtain the desired small thickness of the lamellae by the dragging and shearing action described.

I use the term lamellae to signify any body in which one dimension is very much greater than one at least of its other dimension, and in my final product at least one dimension is very much less than the other two dimensions.

The conformation of the lamellae will depend upon the manner of forming the sheet material. If there is established a movement of the collecting chamber in its entirety and the row relative to and along each other, all the lamellae of the first polymeric material, because of the kind of drag described above, will become U-shaped, with the point of the U leading in the direction of extrusion. The central portion of the U purposely may be missing as will be explained in a following paragraph.

If one side of the collecting chamber is moved relative to the other as the lamellae are passing through it this will drag the sides of the latter with the effect that the lamellae of first polymeric material will be brought to lie substantially parallel to the plane of the sheet material. I call the shape of the lamellae, in the direction transverse to the length dimension of the lamellae, a flattened S in this instance. It is also possible to chop the lamellae into shorter lengths, before the final shear or dragging action in the extrusion device, and the discontinuous lamellae hereby will form rows of U or S profile in the extruded sheet material.

The shape of the lamellae will depend at least in part upon the proportion between the viscosities of the particular polymeric materials that are used as well as their deviations from Newtonian behaviour, and upon the movements and shape of the devices establishing drag and shear.

Generally, the materials should have rather similar viscosities, but the use of different viscosities is facilitated by making a sudden reduction of the thickness of the extrusion nozzle at the orifices, so that a substantial pressure drop is produced within the orifice.

It is sometimes desirable to draw the lamellae in two steps while they are fluid. This may be achieved by supplying the collecting chamber with a large number of dividing walls after the neck so as to form in the collecting chamber a row of channels parallel to the row of extrusion orifices, and feeding the fluid lamellae material emerging from the channels into a second collecting chamber that also extends along the row. This second chamber preferably has a similar internal profile as the first and preferably also includes a neck leading to its slot. This chamber as well as the row of extrusion orifices by which the lamellae are originally formed are preferably stationary with respect to the row of slots, whereas the first collecting chamber is reciprocated or rotated.

In general, I prefer to extrude the lamellae through a circular row of slots, the collecting chamber then being a correspondingly circular collecting chamber. The rotating devices can either be arranged for production of the S-form, or the U-form, or a mixed form between the U and the S.

The product obtained on rotating the collecting chamber as a whole relative to the circular row of slots will have the lamellae arranged as a helice in the extruded tube. The pitch angle of the helice will depend on the relative speeds of rotation, but in case the lamellae are made continuous and the process takes place without any movement of the two parts of the collecting chamber relative to each other, the helices must necessarily become very flat in order to obtain a sufficiently small thickness of the lamellae.

In case the die-lips from which the fluid sheet material is hauled off is rotated as a whole, the nip of the haul-off rollers must be constructed to rotate in similar manner. As an alternative to the rotation of the die-lips, the part of the device containing the row of extrusion orifices may be rotated, in which case the main channels feeding the extrusion orifices will have to be connected to the extruders through suitable concentric revolving fittings.

If the row of slots and collecting chamber are both linear the movement between the chamber and the slots, or between one side of the chamber and the slots has to be reciprocal, with the result that the lamellae will be folded back and forth upon themselves.

Comparing the effect of the different forms of the lamellae, the S-form, or those mixed forms which are predominantly S-formed, generally are more suitable than the U-form and those mixed forms which are predominantly U-formed. This is due to the fact that in a certain, central layer of the sheet of U-formed lamellae the latter gradually change their angle of traversing from the indicated marginal value of 2° to 90° and back to 2° at the same time as the thickness of the reinforcing lamellae generally will be greater than the indicated margin of 10 microns at least within a portion of this layer. Such deviations in a central layer decrease the strength. If, however, the sheet of U-shaped lamellae (hereunder mixed forms still having a U-like cross-section) is cleaved through the core, the resulting sheets, in which the lamellae have the form of a split U, hereinafter called the J-form, will have improved abrasion resistance on the surface which formerly was in the core, now having the lamellae arranged in a kind of pile intimately adhering to the filling material. This cleavage can with advantage take place during haul-off by means of a blade inserted into and parallel to the long slot of the extrusion device, but it can also take place after haul-off by means of a band saw or the like.

However, the preferable way of making such cleaving, particularly with view of production of the J-form, is to avoid extrusion of the reinforcing material in a core layer of the sheet material. This embodiment is carried out by use of an extrusion device, in which first orifices are located in zones on both sides and spaced from a line parallel to the margins of the row of orifices. Because of the lack of reinforcing material in a core layer, the cleaving will be very much facilitated, and can often be carried out by simple peeling. In case the filling material has lower melting point than the reinforcement material, peeling preferably is carried out at a temperature where the filling material is fluid or semi-fluid, but the reinforcement material is solid.

As mentioned, the surface formed by cleavage generally exhibits increased abrasion resistance because it consists of reinforcing lamellae portions in pile-like arrangement, connected by the filling material. If, however, the abrasion resistance is of less importance, but high tensile strength is aimed at, the lamellae portions near the cleaved surface are preferably smeared out by rolling in fluid or semifluid state. The J-form will hereby be converted to an S-form.

While the directly formed S-lamellae generally are longitudinally directed in the sheet, the V and J lamellae as well as the S-lamellae formed via the J-form generally will be directed practically laterally. In any case, it will normally be preferable to use lamellae which are continuous over one of the principal directions of the area of the sheet material, whereas the chopped lamellae arranged in rows may be advantageous in cases where, because of a particular choice of materials, it may be difficult to obtain sufficient fineness of the lamellae by a one-step smearing-out, or in cases where the filling material is a porous material, and it is desirable to give the reinforcing material a slightly discontinuous structure in order to allow a certain passage of liquids or gases through the material.

The sheet material according to the present invention may comprise lamellae of at least one further extrudable material interspersed with the lamellae of reinforcing material and the lamellae of filling material. This may be an adhesive suitable for bonding the lamellae of said reinforcing and filling materials together, such as, for instance, a mixture of the principal polymeric components of said reinforcing and filling materials, or a graft- or block-copolymer of both. Of these possibilities, the graft- or block-polymers generally exhibit the best cohesive strength, whereas the mixture generally is cheaper. In order to increase the cohesive strength of the said mixture, the components should have relatively high molecular weight and should be relatively soft modifications of the respective polymers.

The adhesive material or other material or materials interposed between the reinforcing lamellae and the filling lamellae are injected by means of a separate extruder or extruders through separate channel system or systems to a separate set or sets of extrusion orifices in the row of orifices of the extrusion device. It is within the scope of the invention to arrange the sheet with several different reinforcing materials and/or several different filling materials in the form of separate sets of lamellae. In actual fact, the extrusion device may comprise a rather great number, say 7, of separate channel systems and corresponding sets of orifices.

In order to obtain the highest possible strength, the reinforcing material should generally be a crystalline polymeric material, and whenever possible, the latter should preferably be oriented.

In one embodiment of the present invention, said filling material consists of a mixture of inorganic solid particles and a polymeric binder therefor. Such material may be particularly cheap. Said inorganic, solid particles may, for instance, be carbon, or talc, or water-insoluble oxides, sulphates, silicates, carbonates or sulphides normally used as filling material.

In another embodiment of the present invention, said filling material is a cellular polymeric material. In this form of the invention, there is obtained a combination of strength and volume which for instance makes the material suitable for bookprint paper and several kinds of wrapping material. The volume facilitates the handling of thin sheet material through an increase of stiffness, and with regard to packaging uses the material is suited for protection against impact actions. Because of the very limited number of actually available polymer substances for making cellular products, it will normally be difficult to find suitable combinations of reinforcing material and cellular material which are capable of uniting directly, thus it is normally necessary to interpose a set of adhesive lamellae. The expansion to form the cellular structure can take place by well known methods either during haul-off or later, however the last mentioned possibility seems to be preferable in most cases, as the expansion tends to weaken the reinforcement lamellae when carried out while the latter are fluid. The lamellae of reinforcement material may, in fact, facilitate the expansion by setting up a barrier against diffusion of the expansion agent. The materials may be selected with regard to this effect.

When this embodiment of the invention is applied to make substitute of bookprint paper or for other very light-weight purposes, it may be preferable to obtain the desired small thickness by cleaving a thicker sheet according to the invention along at least one plane parallel to its surface. This can be done with use of cleaving apparatus known from the leather industry.

A suitable combination of materials for the embodiment of the invention, in which the filling material is cellular, is polyethylene as reinforcement material, cellular polystyrene as the filling material, and an adhesive material being interposed.

In another embodiment of the present invention, the lamellae of the filling material comprise a split-fibre network. This provides for a material of high absorbing power. Suitable materials for producing such split-fibre networks are well known in the art. It should be understood that the term split-fibre networks also comprises fibres in the form of needle- to threadformed crystal formations of a crystalline polymer bunched together to a network structure, even when the splitting has been carried out without any molecular orientation being present.

In a further development of this embodiment also the reinforcement material comprises split-fibre network material, however, of higher strength and lower average fibre fineness than that forming the lamellae of the filling material. In this form, the product is suitable as layer(s) in non-woven fabric or even as an independent non-woven fabric either for disposable apparel, table cloth, window curtains and the like, or for sanitary textiles or filter materials. The methods of producing the fibrous networks by suitable choice of raw materials (generally intimate mixtures of different polymers) and by processes subsequent to the extrusion of the sheet (such as drawing and swelling and/or leaching) can easily be carried out by an expert by adaption of the known art.

In still another embodiment of the present invention, the reinforcing lamellae consist of crystalline, oriented polymeric material, whereas the filling material has a higher flexibility than the reinforcing material. This material has a surprising overall strength and is very suitable for heavy duty bags, for different kinds of wrapping material and for many other purposes, where in particular a combination of tensile strength, flexibility, initial tear strength, tear propagation strength and impact strength is required. It appears that the flexible lamellae are very suitable for smoothing out the force actions of tearing and for absorbing shock actions.

Said flexible filling material can, in order to establish the intimate adhesive bonding, be a co-polymeric modification of the principal polymeric component of the reinforcement material. Thus, it can, with great advantage, be a block-copolymer containing segments of the principal polymeric component of the reinforcement material and segments of an elastomer, or alternatively, a graft-polymer having branches of the principal polymeric component of the reinforcement material grafted upon an elastomeric backbone.

In case the more flexible filling material is orientable, it should preferably not be in oriented state in the end product as it ought to exhibit a high ability to yield without breaking. Thus, when the melting range of this filling material is below the melting range of the reinforcement material, as it will normally be, the orienting may be carried out while the filling material is fluid but the reinforcement material is solid, or alternatively, the sheet may be annealed at a suitably high temperature subsequent to the orienting in order to destroy the orientation of the filling material but not that of the reinforcement material.

The lamellae of filling material may extend beyond the lamellae of reinforcing material to form at least one surface layer of the sheet. This is often useful, when the filling material has a lower melting range than the reinforcing material, as it enables sealing together of two sheets without ruining the orientation in the reinforcing lamellae. This extension of the lamellae is obtained by making the orifices in the row extend corresponding one set beyond the other. However, a material suitable for the flexible filling lamellae will often be too sticky for being suitable as a surface layer. It is preferable to intersperse with the lamellae of reinforcing and filling material lamellae of a crystalline polymeric material having a substantially lower melting range than the reinforcing material. This lower melting, crystalline material should be adjacent at least one surface and extend beyond both to form at least one surface layer of the sheet. Because of its lower melting range it serves the sealing of the material, and because of its crystallinity it is non-sticky and will exhibit a suitable cohesive strength. Preferably this surface material should only overlap the adjacent reinforcing lamellae over a relatively small distance. For obtaining such arrangements, the slots in the row are constructed correspondingly.

In order to obtain, for instance, very thin sheets of high and relatively balanced strength, the sheet material of reinforcing lamellae and flexible filling lamellae can with advantage be biaxially molecularly oriented. Biaxially oriented film material normally exhibits high tensile strength but extremely low tear propagation resistance. However, it has proved that the product according to this embodiment of the present invention provides a surprising improvement of tear propagation resistance.

Still higher tear propagation resistance is obtained when the lamellae of the reinforcement material have a predominant direction of molecular orientation and the sheet is laminated to another sheet having a different predominant direction of orientation. Preferably, the last mentioned sheet should also be a sheet of oriented reinforcing lamellae and flexible filling lamellae according to the invention.

The best results as regards as well tear propagation resistance as the overall strength properties have been obtained with sheets of such cross-laminated type, when the sheet or sheets in addition to the orientation in the predominant direction also have a substantial orientation in another direction. I herewith mean that the area of the sheet material should be drawn at a higher ratio than the ratio of increasing any of the linear dimensions during the orientation. Said ratios can be detected in the end product by means of X-ray defraction technique.

The sheet of oriented reinforcing lamellae and flexible filling lamellae may with advantage be made from high-density polyethylene as the reinforcing material, as this polymer is cheap and technically suitable. The corresponding filling material may, for instance, be a copolymer between ethylene and vinyl-acetate, which is suitable for establishing a non-sticky sealable layer.

Alternatively the reinforcing material may with advantage consist of isotactic or syndiotactic polypropylene, whereas the corresponding filling material may, for instance, be a block-copolymer having segments of polypropylene and segments of randomly co-polymerized ethylene/propylene. Other suitable combinations for any particular purpose can easily be selected by an expert.

DESCRIPTION OF THE PREFERRED EMBODIMENTS

Figure 1:
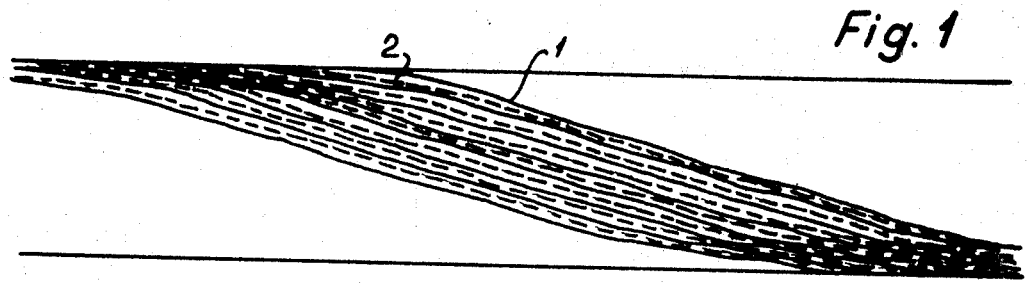
FIG. 1 is a section through the extruded sheet material transverse to the continuous dimension of the lamellae (or the continuous dimension of the rows of chopped lamellae), showing lamellae of flattened S-form.
Figure 2:
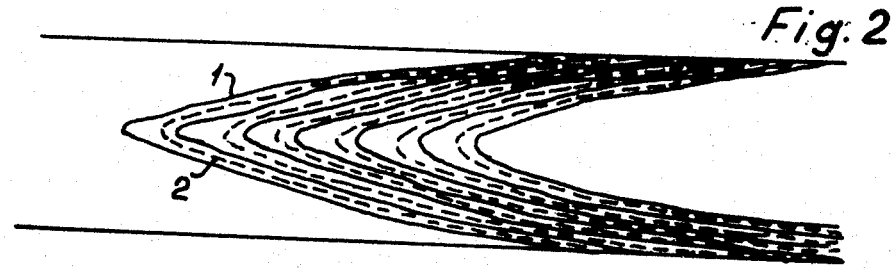
FIG. 2 is a similar section showing U-formed lamellae.
Figure 3:
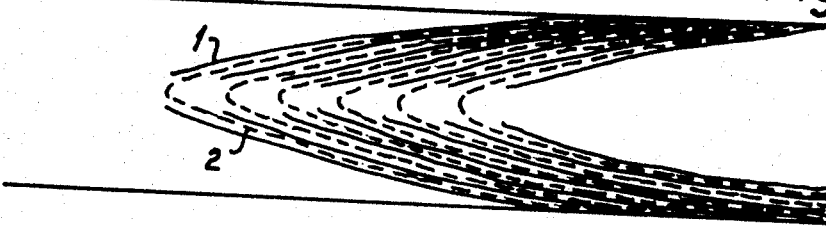
FIG. 3 is a similar section showing the J-form of the reinforcing lamellae, resulting when the U is split already in connection with the extrusion of the lamellae, the sheet being shown before the actual cleavage.

In FIGS. 1, 2 and 3, the film material is shown, for simplicity, as being made of solely two materials, 1 being the reinforcing material and 2 being the filling material. For clarity, the lamellae are represented by lines, but in actual fact they have of course a thickness corresponding to the spacing of the full and dotted lines. Their thickness and the angles to the plane of the sheet are grossly exaggerated, as in fact the overall angle between the lamellae and the dimension of the sheet is below 2°, and the thickness of the reinforcing lamellae is in the range between 0.1 and 10 microns. In FIG. 3 it is further shown that material 1 is absent in a layer in the core of the sheet, whereas material 2 is present all over.

Figure 5:
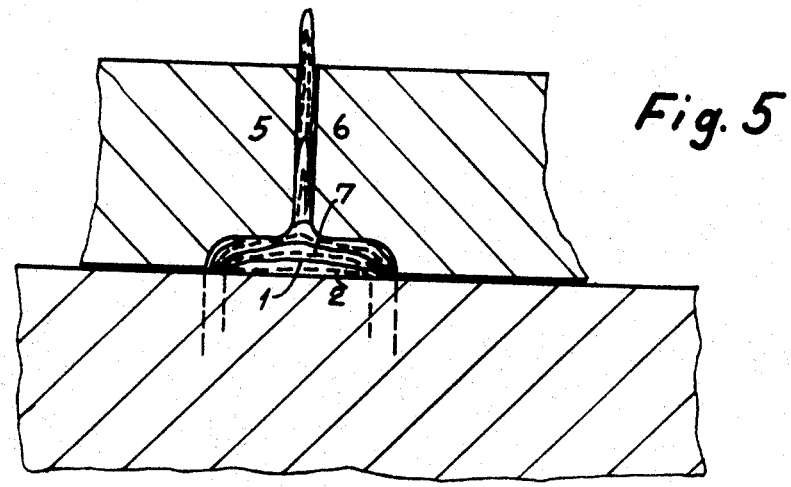
FIG. 5 is a diagrammatic section transverse to the collecting chamber shown in FIG. 3, showing, however, a collection chamber suitable for obtaining the U-form and further showing how lamellae are dragged into this form.
Figure 4:
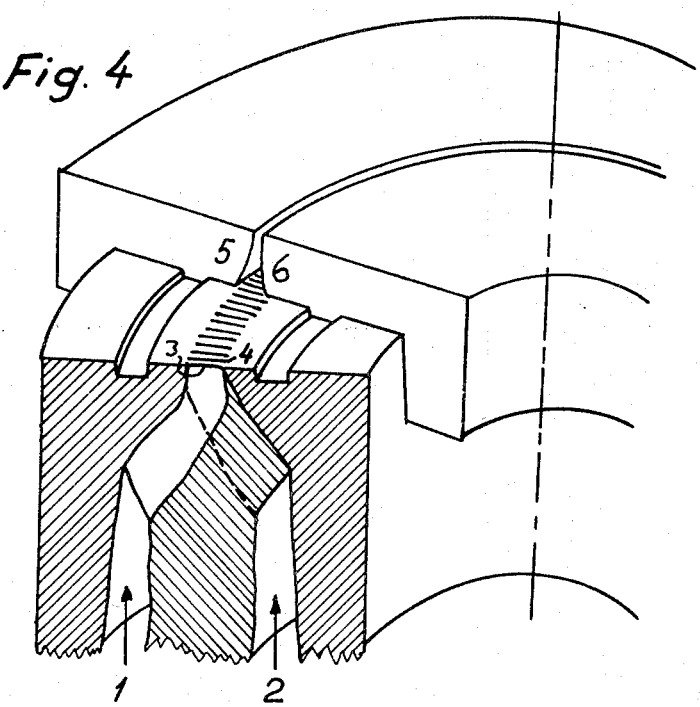
FIG. 4 is a diagrammatic perspective view, partly in section, of a ring die comprising a circular row of extrusion slots, and a collecting chamber ending with a slot for haul-off of the sheet, the device being on principle adaptable to any of the forms shown in FIGS. 1, 2 and 3, but the figure showing slots for either S- or U-form and showing a collecting chamber mainly for the S-form.

The apparatus shown in FIG. 4 comprises a row of slots, three for the reinforcement material and four for the filling material, above which is a collecting chamber consisting of parts 5 and 6 which narrow down to an extrusion slot. The two parts of the collecting chamber may be rotated together relative to the row of slots so that the drag exerted by the bottom of the collecting chamber on the lamellae 1 and 2 as they are extruded from slots 5 and 6 causes the lamellae to be laid substantially flat along the row. Simultaneously, however, the lamellae are forced upwards by fresh polymeric material being extruded through the slots and as they are forced upwards their sides drag against the sides of the collecting chamber, as indicated in FIG. 5, and in particular against the neck 7 (not shown in FIG. 4), and the U-form of FIG. 2 results.

Figure 6:
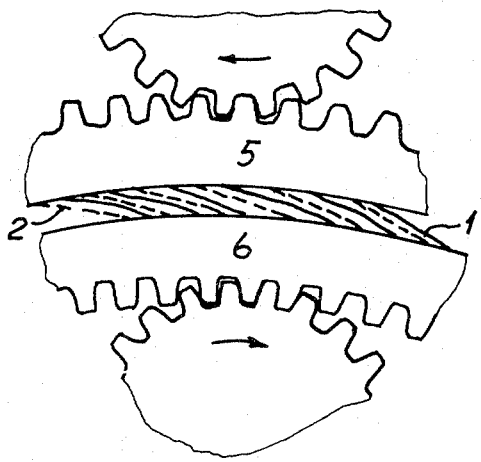
FIG. 6 is a diagrammatic view from above of an apparatus as in FIG. 4, showing the drive and the emerging S-structure.

However, as shown in FIG. 6, the two parts 5 and 6 of the collecting chamber may also be moved in opposite directions to exert a symmetrical drag on the two sides of the lamellae, whereby the S-form is produced. For this purpose, the reduction of thickness within the collecting chamber ought to take place less rapidly, and it is even possible to carry out the process without said reduction.

Furthermore it is shown that this zone of shear (chamber parts 6 and 7) follows immediately after the row of slots. This too is a preferable, but with respect to the S-form not very essential feature, as in fact it is possible to obtain good results when the two sets of lamellae are extruded even into a relatively long chamber where no transversal shear is applied, from there advancing into the zone of shear (parts 5 and 6).

As is easily seen, mixed forms between the S and the U can also be produced by suitably selecting the relative and absolute speeds of the two parts 5 and 6.

Figure 7:
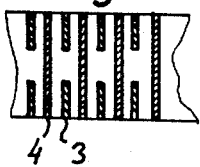
FIG. 7 is a representation of the slot arrangement for producing the structure of FIG. 3.

In FIG. 7, the slots for material 1 are split so that material 2 from slots 4 will be smeared in between the two half-parts of the lamellae of 1. This arrangement is preferably used in connection with the process for making the U-form of the lamellae, which will, however, in this case turn out in the split form, shown in FIG. 3 (the J-form). It is not essential that the orifice parts 3 lie adjacent to each other in the form of a split slot. In fact they can be orifices dislocated from one another.

Figure 8:
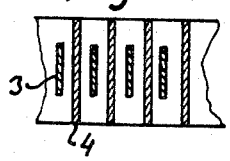
FIG. 8 is a representation of the slot arrangement for producing on both sides of the sheet a surface skin entirely consisting of the filling material.
Figure 9:
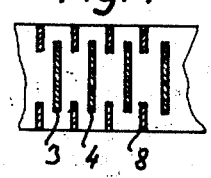
FIG. 9 is a representation of the slot arrangement for producing a skin of a third material on both sides of a sheet consisting of crystalline, oriented lamellae and flexible filling lamellae.

In similar manner the arrangement of FIG. 8 will produce on both sides of the sheet a skin solely consisting of material 2, extruded through slots 4, whereas in FIG. 9 a skin is produced from the material extruded through orifices 8.

In the following examples, the indications of melt indexes refer to ASTM D 1238–62T.

In each of the examples the S-form lamellae are produced by use of the apparatus shown in FIGS. 4 and 6.

EXAMPLE 1

Production of a sheet with high contents of an inorganic filler for use as substitute of book-print paper Reinforcing material: high density polyethylene of melt index 0.2 (ASTM condition E).

Filling material: 50% talc powder+50% low density polyethylene of melt index 70 (ASTM condition E).

Proportion between reinforcement material and filling material about 1:1.

The sheet material should be biaxially drawn at about 110° C. at a ratio of 1:2 in both directions. Thickness before drawing about 0.1 mm.

EXAMPLE 2

Production of a light and stiff expanded sheet for packaging purposes

Reinforcing material: an ethylene/vinyl-acetate copolymer with 5% vinyl-acetate. Melt index 0.3 (ASTM condition E).

Filling material: expandable polystyrene containing petrol ether as expansion agent. Appearing to have about the same melt viscosity as the polyethylene.

Adhesive component: a mixture between (a) the same polyethylene and (b) a polystyrene with small contents of copolymerized butadeine, melt index 0.5 (same condition).

Ratio between reinforcing material and filling material about 1:1.

The expansion takes place during haul-off. Temperature of the circular slot: 120° C. (but higher temperature at the start of the run).

Blow ratio: about 2:1. Weight of the final sheet: about 50 grams per sq. m. Density of the final sheet: about 0.1 kg. per liter.

The product has in particular a high folding strength.

EXAMPLE 3

Production of a wrapping material consisting of crystalline, oriented lamellae and flexible lamellae Reinforcing material: the same high density polyethylene as in Example 1.

Filling material: the same copolymer of ethylene as in Example 2.

Proportion between reinforcing material and filling material: 6:4.

A skin of the filling material is produced on both surfaces.

The sheet is biaxially drawn at about 100° C. at ratios of about 2.5:1 in both directions. It exhibits an improved tear propagation resistance compared to normal biaxially drawn film material.

EXAMPLE 4

Instead of being drawn in balanced manner, the sheet of Example 3 is cross-drawn at ratio 1.5:1 and simultaneously length-drawn at ratio 3:1 at about 100° C. The drawing can take place by means of a tenter frame. Another unoriented sheet of Example 3 is cross-drawn at ratio 3:1 and simultaneously length-drawn at ratio 1.5:1.

The two plies are laminated between nip-rollers, the temperature of the rollers being kept at 80° C. and vapors of toluene being applied to condense into the nip on the sheet surfaces in order to bind the plies together.

The product exhibits improved tear propagation strength compared to a normal cross-laminate.

EXAMPLE 5

Production of a textile web

Reinforcing material polycaprolactam of melt index 2.2 (ASTM condition K) blended with polyethylene of melt index 7 (ASTM condition E) in a planetary extruder. Ratio of polyamide to polyethylene: 75:25.

Filling material: the same components but ratio of polyamide to polyethylene: 55:45.

The shear action should be adjusted to produce layers of an overall thickness of about 2 microns to equal the average diameter of the crystal "whiskers" formed on crystallization of such molten polymer in polymer mixtures when the latter are in drawn state during crystallization.

Blow ratio: 1:1.

Cooling during haul-off: strictly controlled air cooling, hot air being used to keep the temperature of the sheet beyond 160° C. till all the polyamide is crystallized. This temperature control has the purpose of promoting the "growth of the whiskers."

The extruded sheet, having a thickness of about 70 microns, should be passed through a bath of mineral oil for about 10 seconds and in immediate succession hereto cross-drawn by means of a tenter frame, while keeping the temperature at 170° C. and allowing a lengthwise contraction. Finally, the oil should be leached.

The product will be very suitable for many sanitary purposes, and after cross-lamination of two plies of the material, the resultant product will be suitable for disposable apparel. The uniting of the plies can be carried out by application of an elastomeric gluestuff in spots.

I claim:

1. A multi-sheet laminate of at least one extruded and molecularly oriented sheet comprising a reinforcing polymeric material and a filling material having a substantially higher flexibility than said polymeric material, both of said materials being present in said sheet in the form of interspersed intimately adhering thin lamellae, the lamellae of the reinforcing polymeric material having an overall thickness of between 0.9 and 10 microns and traversing the flat dimension of the sheet at an overall angle of less than 2° to the surfaces of the sheet, so as to extend in at least major proportions in substantial parallelism to said surfaces; and at least one other extruded and molecularly oriented sheet comprised of polymeric material laminated with said first sheet with its predominant direction of molecular orientation being different from that of the reinforcing polymeric lamellae of said first sheet.

2. A multi-sheet laminate of at least two extruded and molecularly oriented sheets each such sheet comprising a reinforcing polymeric material and a filling material having a substantially higher flexibility than said polymeric material, both of said materials being present in said sheet in the form of interspersed intimately adhering thin lamellae, the lamellae of the reinforcing polymeric material having an overall thickness of between 0.1 and 10 microns and traversing the flat dimension of the sheet at an overall angle of less than 2° to the surfaces of the sheet, so as to extend in at least major proportions in substantial parallelism to said surfaces; said sheets being laminated together with the predominant molecular orientation of the reinforcing polymeric lamellae of said two sheets arranged in different directions.

References Cited

UNITED STATES PATENTS

| | | | |
|---|---|---|---|
| 3,547,761 | 12/1970 | Rasmussen | 161—168 |
| 3,295,552 | 1/1967 | Powell et al. | 264—171 |
| 3,420,267 | 1/1969 | Veazey | 264—171 |
| 3,461,197 | 8/1969 | Lemelson | 264—172 |
| 3,234,313 | 2/1966 | Miller et al. | 161—252 |

ROBERT F. BURNETT, Primary Examiner

G. W. MOXON, II, Assistant Examiner

U.S. Cl. X.R.

156—244; 161—162, 165, 168, 402